(12) United States Patent
Schreiner (10) Patent No.: US 11,540,438 B2
(45) Date of Patent: Jan. 3, 2023

(54) MULCHING INSERT AND SYSTEM FOR MOUNTING A MULCHING INSERT TO A LAWN MOWER

(71) Applicant: Ariens Company, Brillion, WI (US)

(72) Inventor: Fredric D. Schreiner, Green Bay, WI (US)

(73) Assignee: Ariens Company, Brillion, WI (US)

( * ) Notice: Subject to any disclaimer, the term of this patent is extended or adjusted under 35 U.S.C. 154(b) by 305 days.

(21) Appl. No.: 15/618,279

(22) Filed: Jun. 9, 2017

(65) Prior Publication Data

US 2017/0273237 A1 Sep. 28, 2017

Related U.S. Application Data

(62) Division of application No. 13/966,727, filed on Aug. 14, 2013, now Pat. No. 9,699,960.

(51) Int. Cl.
| | |
|---|---|
| *A01D 34/00* | (2006.01) |
| *A01D 34/63* | (2006.01) |
| *A01D 34/81* | (2006.01) |
| *A01D 101/00* | (2006.01) |

(52) U.S. Cl.
CPC ........... *A01D 34/005* (2013.01); *A01D 34/63* (2013.01); *A01D 34/81* (2013.01); *A01D 2101/00* (2013.01)

(58) Field of Classification Search
CPC ........ A01D 34/81; A01D 34/63; A01D 34/64; A01D 34/66; A01D 34/005; A01D 2101/00
USPC ............................ 56/17.5, 295, 255, DIG. 20
See application file for complete search history.

(56) References Cited

U.S. PATENT DOCUMENTS

| | | |
|---|---|---|
| 2,154,564 A | 4/1939 | Eisenlohr |
| 2,701,942 A | 2/1955 | Caldwell, Jr. et al. |
| 2,734,327 A | 2/1956 | Whitney |
| 2,796,714 A | 6/1957 | Denney |
| 3,049,854 A | 8/1962 | Denney |
| 3,157,015 A | 11/1964 | Russell et al. |
| 3,320,731 A | 5/1967 | Cody et al. |
| 3,563,014 A | 2/1971 | Krewson |
| 3,890,772 A | 6/1975 | Seifert et al. |
| 3,905,182 A | 9/1975 | Geier |
| 3,959,954 A | 6/1976 | Halsten |
| D250,027 S | 10/1978 | Jackson |
| 4,189,903 A | 2/1980 | Jackson et al. |
| 4,196,568 A | 4/1980 | Perry |
| 4,235,068 A | 11/1980 | Comer |
| 4,366,995 A | 1/1983 | Kocian |

(Continued)

FOREIGN PATENT DOCUMENTS

| | | |
|---|---|---|
| GB | 1152816 | 5/1969 |
| WO | 2016025530 | 2/2016 |

*Primary Examiner* — Thomas B Will
*Assistant Examiner* — Joan D Misa
(74) *Attorney, Agent, or Firm* — Michael Best & Friedrich LLP (57) ABSTRACT

A mulching insert for use with a lawn mower having a frame and a cutting deck supported by the frame, includes a molded, single-piece body configured to be received in the cutting deck. The body includes an attachment portion that is configured to be engaged by a portion of the lawn mower to removably mount the body to the cutting deck. The body defines a mulching chamber within the cutting deck that provides clearance for a cutting blade of the lawn mower.

10 Claims, 6 Drawing Sheets

(56) References Cited

U.S. PATENT DOCUMENTS

| | | |
|---|---|---|
| 4,450,673 A | 5/1984 | Hutchison |
| 4,817,372 A | 4/1989 | Toda et al. |
| 4,887,420 A | 12/1989 | Cerny, Jr. et al. |
| 5,042,242 A | 8/1991 | Evans |
| 5,129,217 A | 7/1992 | Loehr |
| 5,133,176 A * | 7/1992 | Baumann ............. A01D 34/685 56/17.4 |
| 5,184,451 A | 2/1993 | Savipakka et al. |
| 5,210,998 A | 5/1993 | Hojo et al. |
| 5,212,938 A | 5/1993 | Zenner et al. |
| 5,481,857 A | 1/1996 | Umemoto et al. |
| 5,483,790 A | 1/1996 | Kuhn et al. |
| 5,638,667 A | 6/1997 | Ellson et al. |
| 5,638,668 A | 6/1997 | Kallevig et al. |
| 5,669,213 A | 9/1997 | Britton |
| 5,791,132 A | 8/1998 | Wiedenmann |
| 5,809,765 A | 9/1998 | Hastings et al. |
| 5,884,466 A | 3/1999 | Willmering et al. |
| 5,890,354 A | 4/1999 | Bednar |
| 6,065,276 A * | 5/2000 | Hohnl .................. A01D 34/005 56/320.1 |
| 7,065,946 B2 * | 6/2006 | Boeck .................. A01D 34/005 56/320.1 |
| 7,146,791 B2 * | 12/2006 | Benway ............... A01D 42/005 56/320.2 |
| D563,436 S * | 3/2008 | Williams ....................... D15/17 |
| 7,610,742 B2 | 11/2009 | Imanishi et al. |
| 7,617,665 B2 * | 11/2009 | Yamashita ........... A01D 42/005 56/320.2 |
| 7,685,799 B2 | 3/2010 | Samejima et al. |
| 8,234,848 B2 | 8/2012 | Messina et al. |
| 9,699,960 B2 | 7/2017 | Schreiner |
| 2007/0289282 A1 | 12/2007 | Yamashita et al. |
| 2012/0023887 A1 | 2/2012 | Messina et al. |

* cited by examiner

MULCHING INSERT AND SYSTEM FOR MOUNTING A MULCHING INSERT TO A LAWN MOWER

CROSS-REFERENCE TO RELATED APPLICATIONS

This application is a divisional of U.S. patent application Ser. No. 13/966,727, filed Aug. 14, 2013, the entire contents of which are incorporated by reference herein.

FIELD OF THE INVENTION

The present invention relates to lawn mowers and, more particularly, to mulching inserts and systems for mounting mulching inserts to lawn mowers.

SUMMARY

In one embodiment, the invention provides a system for mounting a mulching insert to a lawn mower. The system includes a cutting deck configured to receive the mulching insert and a spindle extending from the cutting deck. The spindle is configured to support a cutting blade for rotation relative to the cutting deck. The system also includes a spindle housing mounted to the cutting deck and surrounding the spindle. The system further includes a mounting member coupled to the spindle housing. The mounting member is configured to support the mulching insert within the cutting deck.

In another embodiment, the invention provides a mulching insert for use with a lawn mower. The lawn mower includes a frame and a cutting deck supported by the frame. The mulching insert includes a molded, single-piece body configured to be received in the cutting deck. The body includes an attachment portion that is configured to be engaged by a portion of the lawn mower to removably mount the body to the cutting deck. The body defines a mulching chamber within the cutting deck that provides clearance for a cutting blade of the lawn mower.

In yet another embodiment, the invention provides a lawn mower including a frame, a plurality of wheels coupled to the frame, and a cutting deck supported by the frame. The lawn mower also includes a mulching insert received in the cutting deck and a spindle extending from the cutting deck. The spindle is configured to support a cutting blade for rotation relative to the cutting deck. The lawn mower further includes a spindle housing mounted to the cutting deck and surrounding the spindle and a mounting member coupled to the spindle housing to support the mulching insert within the cutting deck.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. In addition, the terms "upper," "lower," etc. are used to facilitate description of the invention with reference to the drawings and a lawn mower and are not intended to be limiting.

Figure 1:
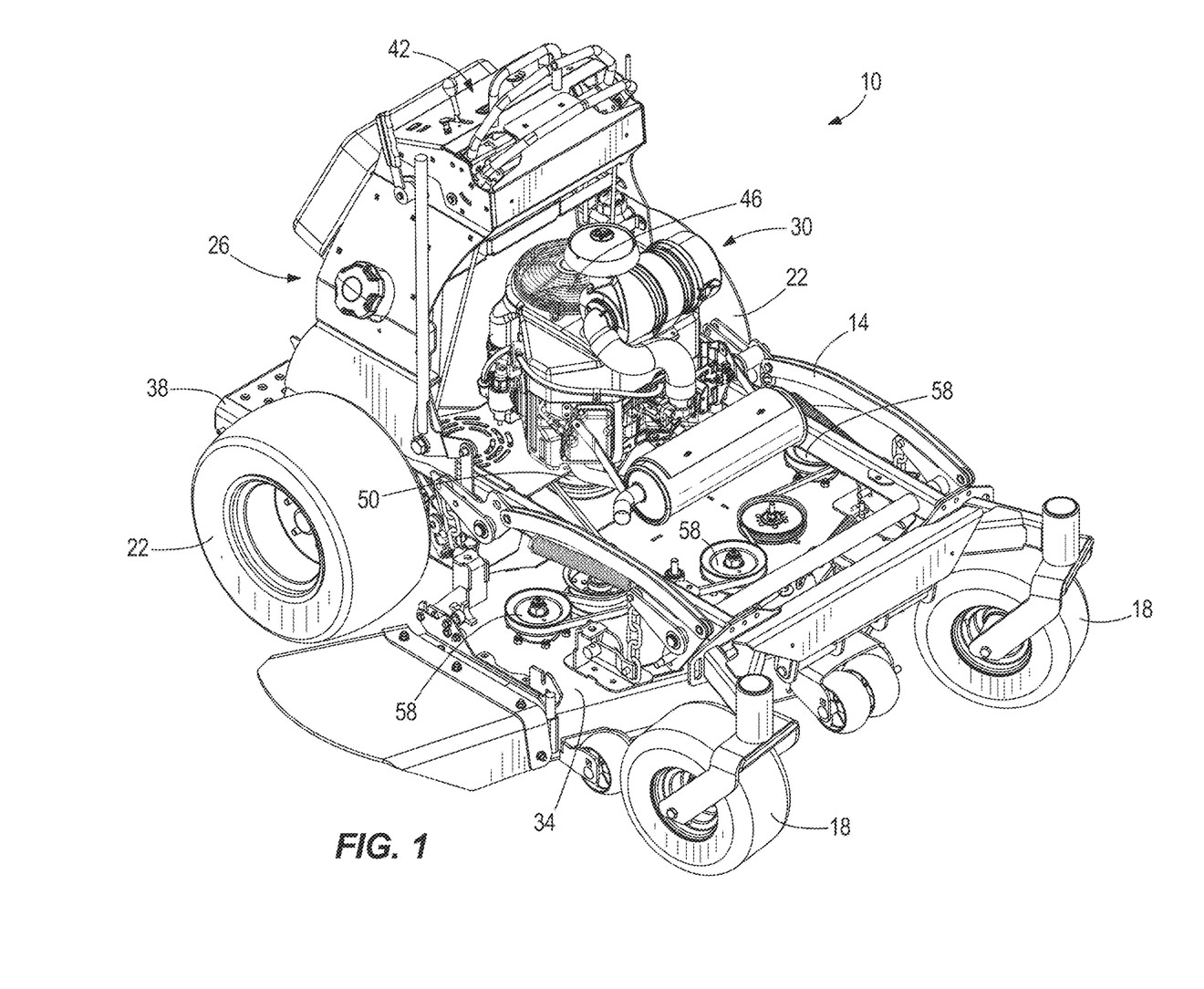
FIG. 1 is a perspective view of a lawn mower.

FIG. 1 illustrates a lawn mower 10. In the illustrated embodiment, the lawn mower 10 is a standing ride-on lawn mower, which is a lawn mower on which the operator stands rather than sits. In other embodiments, the lawn mower 10 may be a mid-mount, riding lawn mower or an out-front, walk behind lawn mower. The illustrated lawn mower 10 includes a frame 14, two front wheels 18 coupled to the frame 14, two rear drive wheels 22 coupled to the frame 14, an operator platform and control tower assembly 26, a mower drive assembly 30, and a cutting deck 34. The operator platform and control tower assembly 26, the mower drive assembly 30, and the cutting deck 34 are supported by the frame 14.

The illustrated front wheels 18 are passive wheels, meaning that the wheels 18 are not driven under power. In addition, the front wheels 18 are caster wheels that are mounted to the frame 14 with an arrangement that permits the wheels 18 to swivel with respect to the frame 14. Such an arrangement accommodates turning and rotating of the lawn mower 10. In some embodiments, the front wheels 18 are not passive, but instead can be actively driven and/or steered by an operator.

The rear drive wheels 22 are driven by the mower drive assembly 30. In the illustrated embodiment, the rear drive wheels 22 are capable of rotating independent of one another in forward and reverse directions to cause forward, reverse, and turning movement of the lawn mower 10. If the rear drive wheels 22 rotate in opposite directions (i.e., one forward and one reverse) at the same speed, the lawn mower 10 rotates about a zero-radius turning axis, or zero-turn or ZT axis.

The operator platform and control tower assembly 26 includes a platform 38 on which an operator stands during operation of the lawn mower 10. The assembly 26 also includes controls 42 that are accessible to an operator standing on the platform 38. The controls 42 are coupled to the mower drive assembly 30 and other components of the lawn mower 10 to control operation of the lawn mower 10. For example, the assembly 26 can include an ignition switch, a blade engagement control, a choke, an engine speed control, a height of cut selector, and the like.

The mower drive assembly 30 includes a prime mover 46 and a transmission 50. The illustrated prime mover 46 is an internal combustion engine. In other embodiments, the prime mover 46 may be an electric or hybrid motor that is at least partially powered by a battery, a fuel cell, or other suitable power source. The transmission 50 is coupled to the prime mover 46 and to the rear wheels 22 to drive the rear wheels 22. The transmission 50 is also coupled to the cutting deck 34 to cause cutting blades 54 (FIG. 2) in the cutting deck 34 to rotate and cut grass or other vegetation.

The cutting deck 34 is mounted to the frame 14 generally beneath the mower drive assembly 30 and in front of the operator platform and control tower assembly 26. The cutting deck 34 supports drive sheaves 58 of the drive assembly 30 that rotate the cutting blades 54 (FIG. 2) during operation of the lawn mower 10. In the illustrated embodiment, the cutting deck 34 supports three drive sheaves 58 and three cutting blades 54. In other embodiments, the cutting deck 34 may support fewer or more drive sheaves and cutting blades (e.g., one drive sheave and one cutting blade), depending on the size of the cutting deck 34 and the lawn mower 10.

Figure 2:
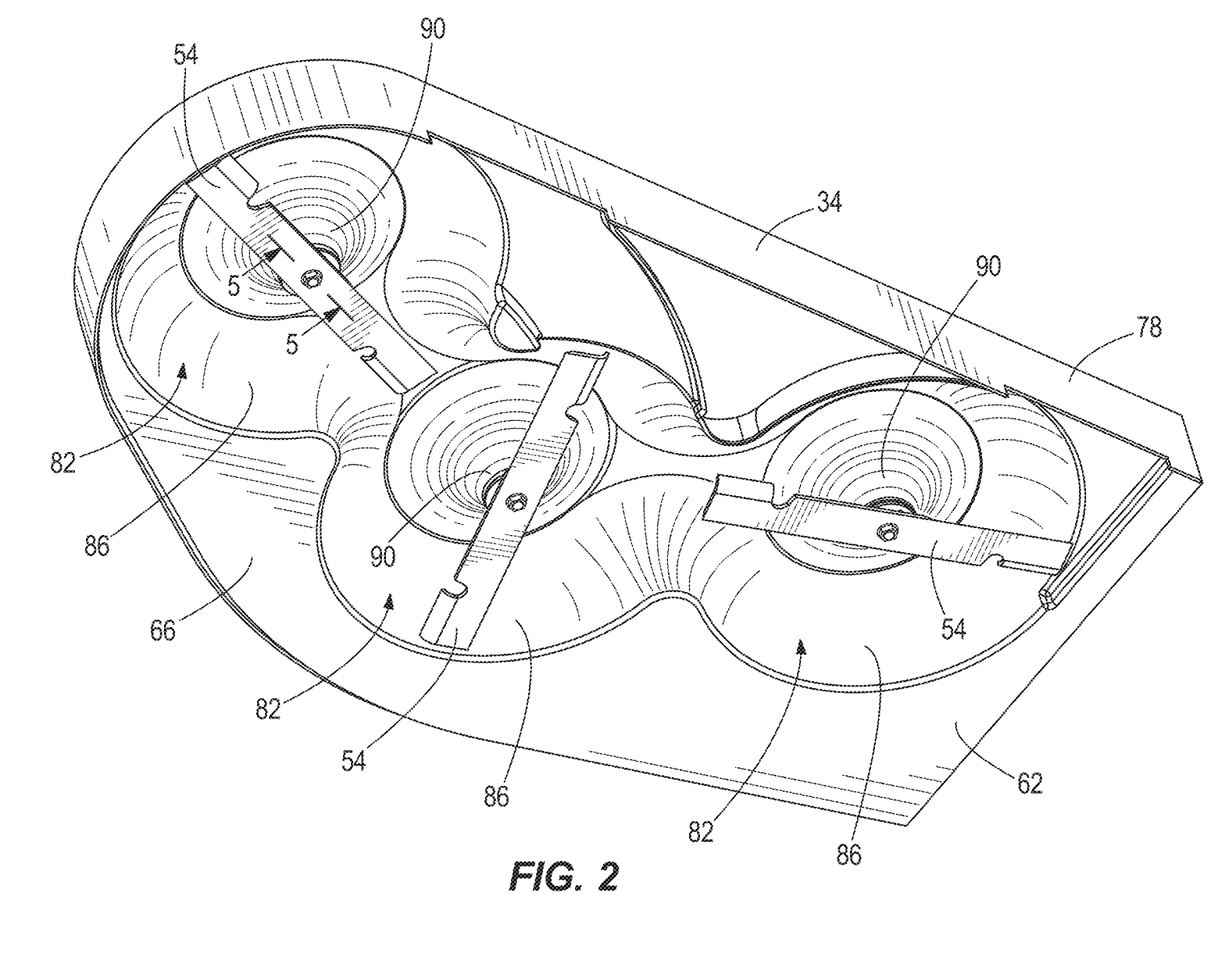
FIG. 2 is a bottom perspective view of a cutting deck of the lawn mower.
Figure 3:
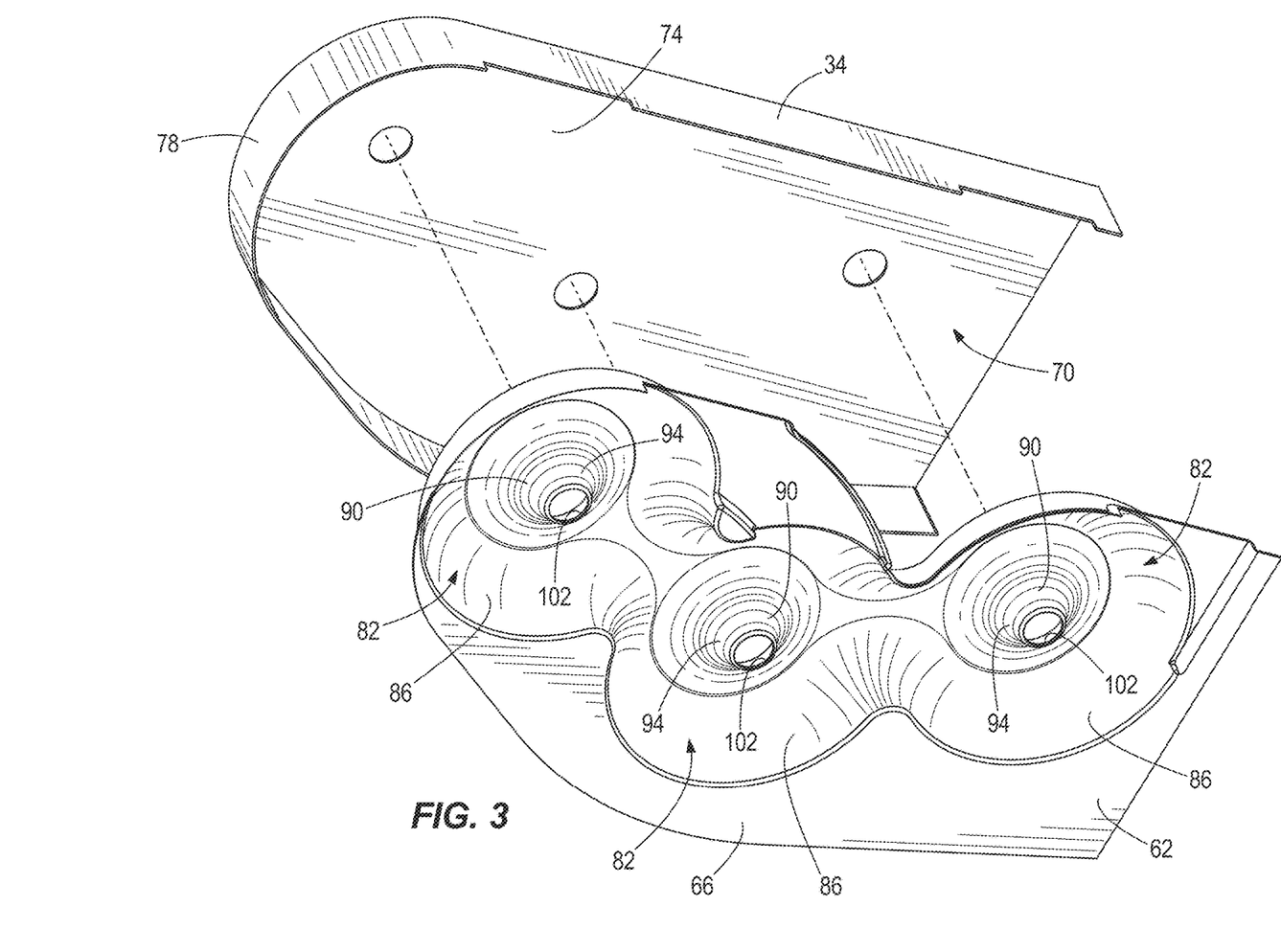
FIG. 3 is an exploded perspective view of the cutting deck and a mulching insert.

As shown in FIGS. 2 and 3, the lawn mower 10 also includes a mulching insert 62. The mulching insert 62 is mountable within the cutting deck 34 to transform the lawn mower 10 into a mulching lawn mower. The mulching insert 62 is also removable from the cutting deck 34 such that the lawn mower 10 can be operated as a non-mulching or bag mower.

The illustrated mulching insert 62 includes a molded, single-piece body 66 configured to be received in a cutting area 70 (FIG. 3) of the cutting deck 34. The cutting area 70 is defined by an inner surface 74 and a sidewall 78 of the cutting deck 34. When positioned in the cutting area 70, the mulching insert 62 fits entirely within and does not extend out of the volume bounded by the sidewall 78 of the cutting deck 34. The body 66 of the mulching insert 62 is composed of a plastic material such that the mulching insert 62 is lightweight, yet durable. The overall dimensions of the body 66 may be varied to fit within different types or sizes of cutting decks. For example, in other embodiments, the body 66 may be designed to fit within a cutting deck that only supports and drives a single cutting blade.

In the illustrated embodiment, the body 66 defines three mulching chambers 82, corresponding to the three cutting blades 54 of the lawn mower 10. The mulching chambers 82 are configured to provide clearance for the cutting blades 54 during operation of the lawn mower 10 (e.g., rotation of the cutting blades 54) so that the cutting blades 54 do not contact the body 66. The mulching chambers 82 are also configured so that grass clippings are mulched, rather than simply cut or clipped, during operation of the lawn mower 10. Each mulching chamber 82 is defined by a generally semi-spherical wall 86 of the body 66. The generally semi-spherical walls 86 form generally concave sections in the body 66 when the lawn mower 10 is viewed from below (as shown in FIGS. 2 and 3).

The three mulching chambers 82 are spaced from, but in communication with each other. That is, each mulching chamber 82 is a distinct chamber that does not require the other chambers 82 to mulch grass clippings. The generally semi-spherical walls 86, however, do not extend entirely around each cutting blade 54. Instead, a portion of each wall 86 is omitted such that the body 66 does not completely divide or isolate each mulching chamber 82 from the adjacent chambers 82. Air and grass clippings can therefore flow between the mulching chambers 82 without having to first drop out of the mulching insert 62 and the cutting area 70 of the cutting deck 34.

The illustrated body 66 also includes three attachment portions 90 for removably mounting the body 66 to the cutting deck 34. Each attachment portion 90 includes a boss 94 that is centrally located within the corresponding mulching chamber 82. Each boss 94 surrounds and provides clearance for a corresponding spindle 98 (FIGS. 4 and 5) that drives (e.g., rotates) the corresponding cutting blade 54. The bosses 94 extend axially and outwardly from the generally semi-spherical walls 86 of the body 66 away from the cutting deck 34 (i.e., toward the ground). As shown in FIG. 3, each attachment portion 90 defines an opening 102 in the corresponding boss 94 that receives one of the spindles 98. The openings 102 are formed in lower ends of the bosses 94 opposite from the cutting deck 34.

Figure 4:
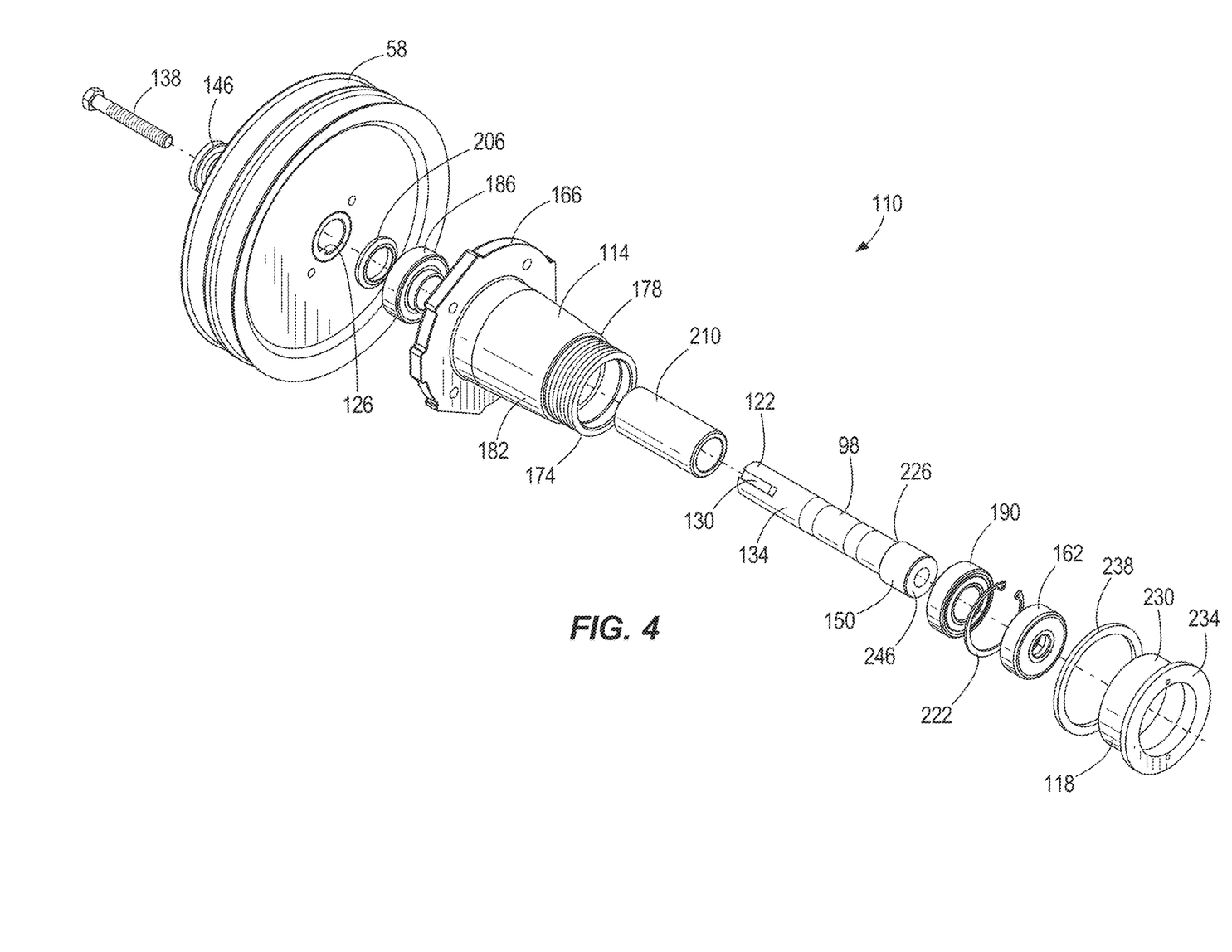
FIG. 4 is an enlarged exploded perspective view of a system for mounting the mulching insert within the cutting deck.
Figure 5:
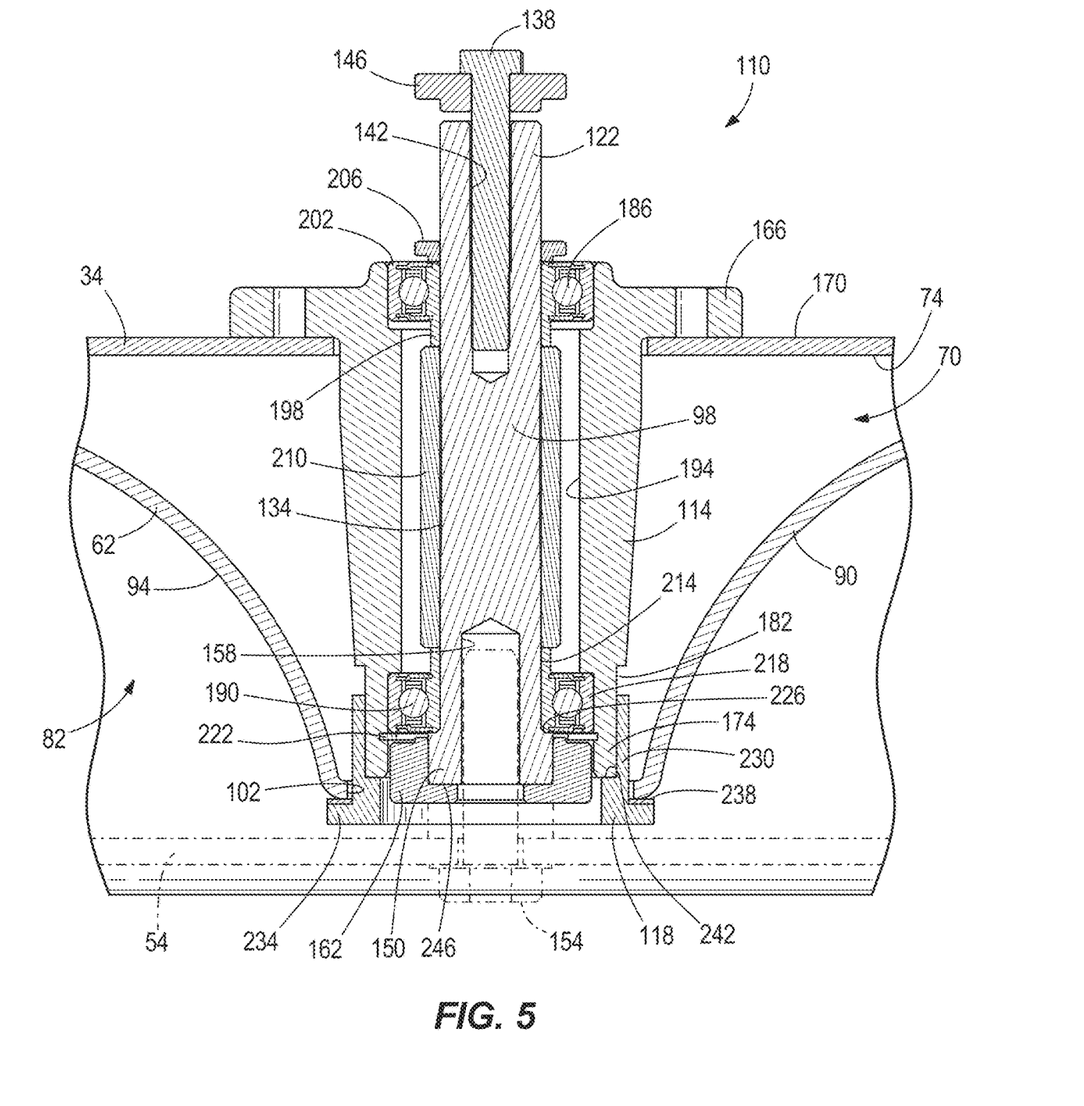
FIG. 5 is a cross-sectional view of the system for mounting the mulching insert taken along section line 5-5 of FIG. 2.
Figure 6:
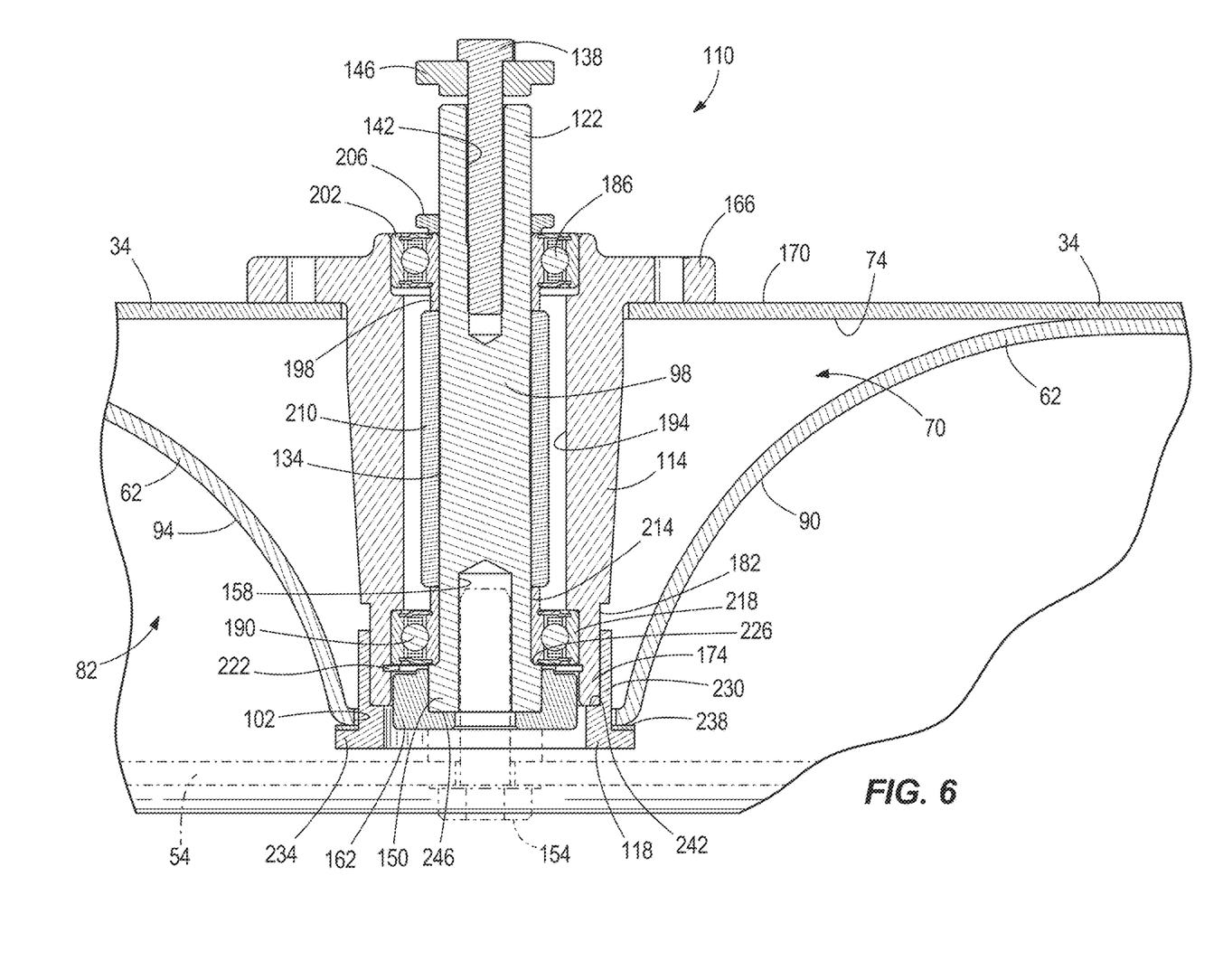
FIG. 6 is a cross-sectional view of the system for mounting the mulching insert taken along section line 5-5 of FIG. 2 in accordance with an alternative embodiment of the invention.

FIGS. 4 and 5 illustrate a system 110 for mounting the mulching insert 62 to the lawn mower 10. In the illustrated embodiment, the system 110 includes the cutting deck 34, the spindles 98 extending from the cutting deck 34, spindle housings 114 surrounding the spindles 98, and mounting members 118 coupled to the spindle housings 114. Although the illustrated system 110 includes three spindles 98, three spindle housings 114, and three mounting members 118 corresponding to the three cutting blades 54 and three attachment portions 90 of the mulching insert 62, only one of each component is shown in FIGS. 4 and 5. The other spindles, spindle housings, and mounting members are substantially the same as and function in a similar manner to the illustrated spindle 98, spindle housing 114, and mounting member 118.

The spindle 98 is mounted to and extends from the cutting deck 34. A first, or upper, end portion 122 of the spindle 98 is connected to one of the drive sheaves 58 of the mower drive assembly 30. The first end portion 122 is keyed to the drive sheave 58 for rotation with the drive sheave 58. In the illustrated embodiment, the drive sheave 58 includes a projection 126 (FIG. 4) that fits within a recess 130 formed in an outer surface 134 of the spindle 98 to key the spindle 98 to the drive sheave 58. In other embodiments, other suitable means (e.g., a flattened or non-circular spindle, splines, press-fitting, etc.) may be used to key the spindle 98 to the drive sheave 58. A threaded fastener 138 extends into an opening 142 in the first end portion 122 of the spindle 98. The threaded fastener 138 secures a washer 146 to a first end of the spindle 98 to keep the spindle 98 from sliding out of the drive sheave 58.

A second, or lower, end portion 150 of the spindle 98 opposite the first end portion 122 is connected to one of the cutting blades 54. A threaded fastener 154 (FIG. 5) extends through the cutting blade 54 and into an opening 158 in the second end portion 150 of the spindle 98 to secure the cutting blade 54 to a second end of the spindle 98. As such, when the spindle 98 is rotated by the drive sheave 58, the spindle 98 also rotates the cutting blade 54. An end cap 162, or blade spacer, is also coupled to the second end portion 150 of the spindle 98. The end cap 162 inhibits cutting debris from entering the space between the spindle 98 and the spindle housing 114. The end cap 162 also helps space the cutting blade 54 apart from the second end of the spindle 98 such that the cutting blade 54 does not interfere with (i.e., contact) the mounting member 118. In some embodiments, the end cap 162 may be omitted or may be sized to space the cutting blade 54 relatively closer to or further away from the second end of the spindle 98.

The illustrated spindle housing 114 is mounted to the cutting deck 34 and surrounds the spindle 98. The spindle housing 114 includes a flange 166 that sits on an outer surface 170 of the cutting deck 34 between the deck 34 and the drive sheave 58. The flange 166 may be bolted, or otherwise secured, to the cutting deck 34. In other embodiments, the spindle housing 114 may be integrally formed as a single piece with the cutting deck 34. The spindle housing 114 also includes a distal end 174 that is spaced apart from the cutting deck 34. The distal end 174 is positioned adjacent the second end portion 150 of the spindle 98. In the illustrated embodiment, the distal end 174 of the spindle housing 114 includes threads 178 formed on an outer surface 182 of the housing 114. The threads 178 are configured to threadably couple the mounting member 118 to the spindle housing 114. In other embodiments, the spindle housing 114 and the mounting member 118 may include other suitable coupling means (e.g., a detent mechanism, a bayonet mount, etc.) to couple the mounting member 118 to the spindle housing 114.

In the illustrated embodiment, the system 110 also includes two bearings 186, 190 positioned between the spindle 98 and the spindle housing 114. The bearings 186, 190 help separate and properly space the spindle 98 from an inner surface 194 of the spindle housing 114. The first, or upper, bearing 186 is positioned adjacent the first end portion 122 of the spindle 98. An inner race 198 and inner surface of the first bearing 186 contacts the spindle 98, while an outer race 202 and outer surface of the first bearing 186 contacts the spindle housing 114. A washer 206 is positioned between the first bearing 186 and the drive sheave 58. A sleeve 210 extends between the bearings 186, 190 and fits tightly around the spindle 98 to support the first bearing 186 on the spindle 98 relative to the second bearing 190.

The second, or lower, bearing 190 is positioned adjacent the second end portion 150 of the spindle 98. An inner race 214 and inner surface of the second bearing 190 contacts the spindle 98, while an outer race 218 and outer surface of the second bearing 190 contacts the spindle housing 114. A snap ring 222 is coupled spindle housing 114 to hold and support the outer race 218 of the second bearing 190 within the spindle housing 114. The inner race 214 of the second bearing 190 is supported by a shoulder 226 formed on the second end portion 150 of the spindle 98.

The mounting member 118, or spindle nut, is coupled to the distal end 174 of the spindle housing 114 to support the mulching insert 62 within the cutting deck 34. The illustrated mounting member 118 includes a body portion 230 and a flange 234. The body portion 230 includes internal threads that engage the threads 178 on the distal end 174 of the spindle housing 114. The flange 234 extends radially outwardly from the body portion 230. The flange 234 engages the mulching insert 62 to capture the mulching insert 62 between the flange 234 and the inner surface 74 of the cutting deck 34. The flange 234 also inhibits cutting debris from entering the space above the mulching insert 62 (i.e., between the mulching insert 62, the inner surface 74 of the cutting deck 34, and the outer surface 182 of the spindle housing 114).

In the illustrated embodiment, an elastomeric or rubber gasket 238 is positioned between the flange 234 of the mounting member 118 and the attachment portion 90 of the mulching insert 62. The gasket 238 takes up manufacturing tolerances to ensure firm contact between the flange 234 and the mulching insert 62. The gasket 238 also provides a relatively soft contact area for the mulching insert 62. Furthermore, the gasket 238 reduces the transmission of vibrations from the cutting deck 34 to the mulching insert 62. In other embodiments, the gasket 238 may be omitted.

As shown in FIG. 5, the body portion 230 of the mounting member 118 includes an inner shoulder 242. The shoulder 242 is configured to engage an end surface or axial face 246 of the spindle housing 114 when the mounting member 118 is coupled to (e.g., threaded onto) the spindle housing 114. The shoulder 242 abuts the end surface 246 to limit how far the mounting member 118 can be threaded onto the spindle housing 114, thereby preventing over-tightening of the mounting member 118.

To assemble the mulching insert 62 within the cutting deck 34, the cutting blade 54 (if attached) is first removed from the spindle 98 by unscrewing the corresponding threaded fastener 154. Then, the mounting member 118 is unthreaded from the spindle housing 114. In embodiments where the lawn mower 10 includes multiple spindles and cutting blades, such as the illustrated embodiment, this same process is carried out for each of the cutting blades and mounting members. Once the cutting blade 54 and the mounting member 118 are removed, the mulching insert 62 is inserted into the cutting deck 34 such that the boss 94 of the attachment portion 90 surrounds the spindle housing 114. The mounting member 118 is then inserted partially into the opening 102 in the attachment portion 90 and threaded onto the distal end 174 of the spindle housing 114 until the shoulder 242 of the mounting member 118 engages the end surface 246 of the spindle housing 114. After the mounting member 118 is secured, the cutting blade 54 can be reconnected to the spindle 98 with the threaded fastener 154.

When assembled, the mulching insert 62 rests on the flange 234 of the mounting member 118 to hold the mulching insert 62 within the cutting deck 34. In the illustrated embodiment, the mulching insert 62 remains slightly spaced apart from the inner surface 74 of the cutting deck 34 so that the mulching insert 62 is not compressed between the mounting member 118 and the cutting deck 34. In such embodiments, a gap exists between the uppermost portion of the mulching insert 62 and the inner surface 74 of the cutting deck 34, allowing the mulching insert 62 to move or shift relative to the cutting deck 34 during operation of the lawn mower 10. Such an arrangement reduces stresses on the mulching insert 62 compared to if the mulching insert 62 was bolted directly to the cutting deck 34. In other embodiments, the uppermost portion of the mulching insert 62 may contact the inner surface 74 of the cutting deck 34 so that mulching insert 62 is slightly compressed when mounted within the cutting deck. Such an arrangement inhibits the mulching insert 62 from rattling during operation of the lawn mower 10.

In addition, the mounting member 118 contacts the mulching insert 62 over a larger surface area than a standard bolt head, reducing the possibility of cracking the mulching insert 62 during assembly. Furthermore, since the mounting member 118 does not thread directly into the mulching insert 62, the opening 102 in the attachment portion 90 of the insert 62 does not wear after repeated fastenings and un-fastenings of the mounting member 118.

To remove the mulching insert 62 from the cutting deck 34, the cutting blade 54 is first removed from the spindle 98 by unthreading the corresponding threaded fastener 154. Then, the mounting member 118 is unthreaded from the distal end 174 of the spindle housing 114 and pulled out of the attachment portion 90 of the mulching insert 62. Once the other cutting blades and mounting members (if present) are also removed, the mulching insert 62 can simply be slid out of the cutting deck 34.

Various features and advantages of the invention are set forth in the following claims.

The invention claimed is:

1. A lawn mower comprising:
a frame;
a plurality of wheels coupled to the frame;
a cutting deck supported by the frame;
a first spindle assembly extending from the cutting deck;
a second spindle assembly extending from the cutting deck;
a first cutting blade supported by the first spindle assembly for rotation relative to the cutting deck;
a second cutting blade supported by the second spindle assembly for rotation relative to the cutting deck; and
a mulching insert including a molded, single-piece body received in the cutting deck, the body including a first attachment portion that is engaged by the first spindle assembly to removably mount the body to the cutting deck in a manner that inhibits rotation of the body relative to the cutting deck, and the body defining a first mulching chamber and a second mulching chamber within the cutting deck, wherein the first mulching chamber provides clearance for the first cutting blade of the lawn mower and the second mulching chamber provides clearance for the second cutting blade,
wherein the first and second mulching chambers are in communication with each other,
wherein the first spindle assembly includes a first spindle supporting the first cutting blade, a first spindle housing surrounding the first spindle, and a first mounting member coupled to a distal end of the first spindle housing,
wherein the first attachment portion of the mulching insert includes a first boss that surrounds at least a portion of the first spindle and the mulching insert defines a first opening in the first boss that receives the first spindle,
wherein the first mounting member engages the first attachment portion of the mulching insert to support the mulching insert within the cutting deck.

2. The lawn mower of claim 1, wherein the first attachment portion of the mulching insert is centrally located within the first mulching chamber.

3. The lawn mower of claim 1, wherein the body of the mulching insert includes a generally semi-spherical wall that defines the first and second mulching chambers.

4. The lawn mower of claim 1, wherein the second spindle assembly includes a second spindle supporting the second cutting blade, a second spindle housing surrounding the second spindle, and a second mounting member coupled to a distal end of the second spindle housing, and wherein a second attachment portion of the mulching insert includes a second boss that surrounds at least a portion of the second spindle.

5. The lawn mower of claim 4, wherein the second attachment portion of the mulching insert defines a second opening in the second boss, and wherein the second opening receives the second spindle.

6. The lawn mower of claim 5, wherein the second mounting member engages the second attachment portion of the mulching insert to support the mulching insert within the cutting deck.

7. The lawn mower of claim 1, wherein the mulching insert is slightly spaced apart from an inner surface of the cutting deck so that the mulching insert is not compressed between the first mounting member and the cutting deck.

8. The lawn mower of claim 1, wherein the mulching insert contacts an inner surface of the cutting deck so that the mulching insert is compressed between the first mounting member and the cutting deck.

9. The lawn mower of claim 1,
wherein the second mulching chamber within the cutting deck is spaced from the first mulching chamber.

10. The lawn mower of claim 1, wherein the cutting deck includes a sidewall defining a cutting area, and wherein the mulching insert fits entirely within a volume bounded by the sidewall.

* * * * *